(12) United States Patent (10) Patent No.: US 9,091,530 B1
Ashford et al. (45) Date of Patent: Jul. 28, 2015

(54) CALIBRATION SYSTEM AND METHOD FOR A THREE-DIMENSIONAL MEASUREMENT SYSTEM

(71) Applicant: The Boeing Company, Chicago, IL (US)

(72) Inventors: Curtis M. Ashford, St. Peters, MO (US); Gary Hines, II, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/301,254

(22) Filed: Jun. 10, 2014

(51) Int. Cl.
*G01B 11/14* (2006.01)
*G01B 11/03* (2006.01)

(52) U.S. Cl.
CPC ...................................... *G01B 11/03* (2013.01)

(58) Field of Classification Search
USPC ................................. 356/625–640, 614–624
See application file for complete search history.

(56) References Cited

U.S. PATENT DOCUMENTS

| 5,681,981 | A | 10/1997 | McMurtry |
| 2007/0024810 | A1 | 2/2007 | Ashford |
| 2009/0229339 | A1 | 9/2009 | Ashford et al. |
| 2013/0201491 | A1 | 8/2013 | Ashford et al. |
| 2013/0264438 | A1 | 10/2013 | Ashford et al. |

OTHER PUBLICATIONS

European Patent Office Extended European Search Report for Counterpart Patent Application No. 13151726.0-1558 / 2623930, Applicant The Boeing Company, dated Feb. 11, 2014, 6 pages.

*Primary Examiner* — Tri T Ton

(57) ABSTRACT

A calibration system for a three-dimensional measurement system having a calibration standard assembly positioned in a large scale three-dimensional volumetric area. The calibration standard assembly has a stable base portion and a plurality of structural members disposed on the stable base portion. The calibration standard assembly has a plurality of target position nests coupled to the plurality of structural members. Each target position nest has a known three-dimensional location determined with a coordinate measuring device and a plurality of retroreflective targets. The calibration standard assembly has a plurality of calibration targets each having a same diameter as a diameter of each of the retroreflective targets. The calibration system has a three-dimensional measurement system for measuring locations of the plurality of calibration targets. The plurality of calibration targets are three-dimensional standards having known three-dimensional locations that are used in calibration of the three-dimensional measurement system.

21 Claims, 10 Drawing Sheets

CALIBRATION SYSTEM AND METHOD FOR A THREE-DIMENSIONAL MEASUREMENT SYSTEM

BACKGROUND

1) Field of the Disclosure

The disclosure relates generally to measurement systems, and more particularly, to calibration systems and methods for three-dimensional measurement systems.

2) Description of Related Art

The measurement volume and measurement speed of large scale three-dimensional measurement systems and devices has expanded significantly to the degree that it may be difficult to develop suitable calibration standards. The calibration of large scale three-dimensional measurement systems and devices is typically conducted in a large volumetric area with a stable controlled environment. However, it may be difficult to obtain or justify the amount of floor space that would be required to support such calibration.

Known calibration systems for measuring large scale three-dimensional measurement systems and devices exist. For example, such known calibration systems may use large scale volumetric areas, such as underground or open public tunnels. However, such underground or open public tunnels may be difficult locations to environmentally control and to secure, and thus may not be viable as a calibration ranges. In addition, such underground or open public tunnels may be difficult locations to measure and set up instrumentation and equipment to perform ongoing calibration.

Further, known calibration systems for measuring large scale three-dimensional measurement systems and devices may use laser projector or tracking devices requiring manually positioning and photographing targets at various locations within the large scale three-dimensional measurement system. However, such known calibration systems may be labor intensive and time consuming and may only approximate the calibration using error factors.

Accordingly, there is a need in the art for an improved calibration system and method for a three-dimensional measurement system that provide advantages over known systems and methods.

SUMMARY

Example implementations of the present disclosure provide an improved calibration system and method for a three-dimensional measurement system to overcome the difficulty and laborious nature of existing solutions. As discussed in the below detailed description, embodiments of the improved calibration system and method for a three-dimensional measurement system may provide significant advantages over existing systems and methods.

In one embodiment there is provided a calibration system for a three-dimensional measurement system. The calibration system comprises a calibration standard assembly positioned in a large scale three-dimensional volumetric area.

The calibration standard assembly comprises a stable base portion and a plurality of structural members disposed on the stable base portion. The calibration standard assembly further comprises a plurality of target position nests coupled to the plurality of structural members. Each target position nest has a known three-dimensional location measured with a coordinate measuring device and a plurality of retroreflective targets. The plurality of target position nests are configured to seat the plurality of retroreflective targets during measurement with the coordinate measuring device.

The calibration standard assembly further comprises a plurality of calibration targets each having a same diameter as a diameter of each of the retroreflective targets. The plurality of target position nests is configured to seat the plurality of calibration targets during calibration.

The calibration system further comprises a three-dimensional measurement system for measuring locations of the plurality of calibration targets. The plurality of calibration targets are three-dimensional standards having known three-dimensional locations that are used in calibration of the three-dimensional measurement system based on measurements of the known three-dimensional locations of the plurality of calibration targets by the three-dimensional measurement system.

In another embodiment there is provided a calibration system for a laser-based three-dimensional measurement system in a large scale three-dimensional volumetric area. The calibration system comprises a calibration standard assembly positioned in the large scale three-dimensional volumetric area. The calibration standard assembly comprises one or more stable surface plates. The calibration standard assembly further comprises a plurality of structural members disposed on the one or more stable surface plates.

The calibration standard assembly further comprises a plurality of target position nests coupled to the plurality of structural members. Each target position nest has a known three-dimensional location measured with a laser tracker device and a plurality of spherically mounted retroreflectors (SMRs). The plurality of target position nests is configured to seat the plurality of spherically mounted retroreflectors (SMRs) during measurement with the laser tracker device.

The calibration standard assembly further comprises a plurality of satin finish spheres each having a same diameter as a diameter of each of the spherically mounted retroreflectors (SMRs). The plurality of target position nests is configured to seat the plurality of satin finish spheres during calibration.

The calibration standard assembly further comprises a plurality of floor mounted target position nests positioned around the one or more stable surface plates of the calibration standard assembly. The plurality of floor mounted target position nests are configured to seat the plurality of spherically mounted retroreflectors (SMRs) during measurement with the laser tracker device and configured to seat the plurality of satin finish spheres during calibration.

The calibration system further comprises a laser-based three-dimensional measurement system for measuring locations of the satin finish spheres. The laser-based three-dimensional measurement system comprises a three-dimensional laser scanner, wherein the plurality of satin finish spheres are three-dimensional standards having known three-dimensional locations that are used in calibration of the laser-based three-dimensional measurement system based on measurements of the known three-dimensional locations of the plurality of satin finish spheres by the three-dimensional laser scanner.

In another embodiment there is provided a method for calibration of a three-dimensional measurement system. The method comprises the step of arranging throughout a large scale three-dimensional volumetric area a plurality of structural members on a stable base portion and coupling a plurality of target position nests to the plurality of structural members. The method further comprises the step of positioning a plurality of retroreflective targets on the plurality of target position nests. The method further comprises the step of measuring the plurality of target position nests using a coordinate measuring device and the plurality of retroreflective targets to obtain known three-dimensional locations of each of the plurality of target position nests.

The method further comprises the step of replacing the plurality of retroreflective targets positioned on the plurality of target position nests with a plurality of calibration targets, each calibration target having a same diameter as a diameter of each retroreflective target. The method further comprises the step of measuring locations of the calibration targets using a three-dimensional measurement system to generate a point cloud of measured locations on a surface of each calibration target and to construct a center point of each calibration target, thus calibrating the three-dimensional measurement system.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1A:
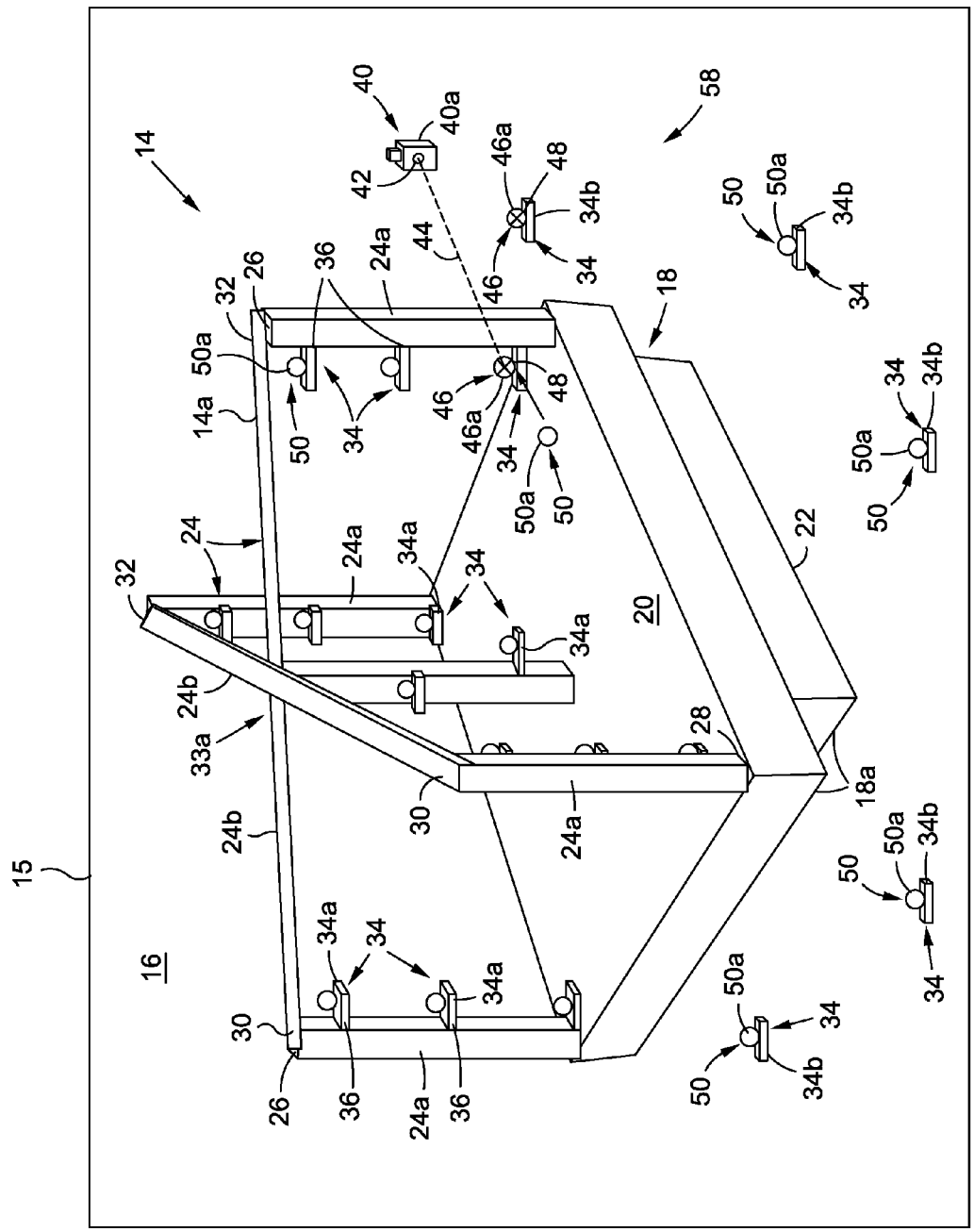
FIG. 1A is an illustration of a perspective view of an embodiment of a calibration standard assembly for use in a calibration system for a three-dimensional measurement system of the disclosure.
Figure 1B:
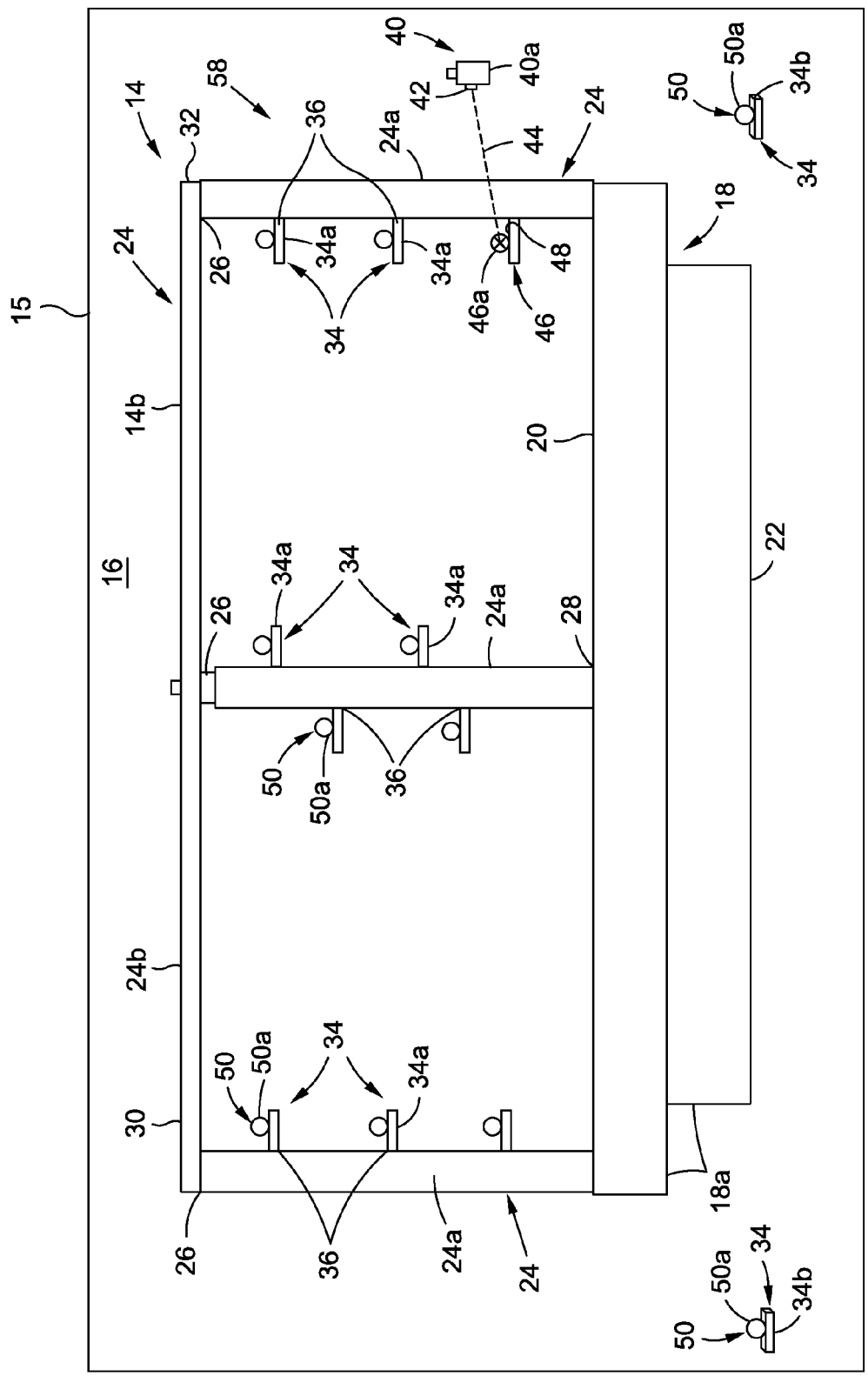
FIG. 1B is an illustration of a side view of another embodiment of a calibration standard assembly for use in a calibration system for a three-dimensional measurement system of the disclosure.
Figure 1C:
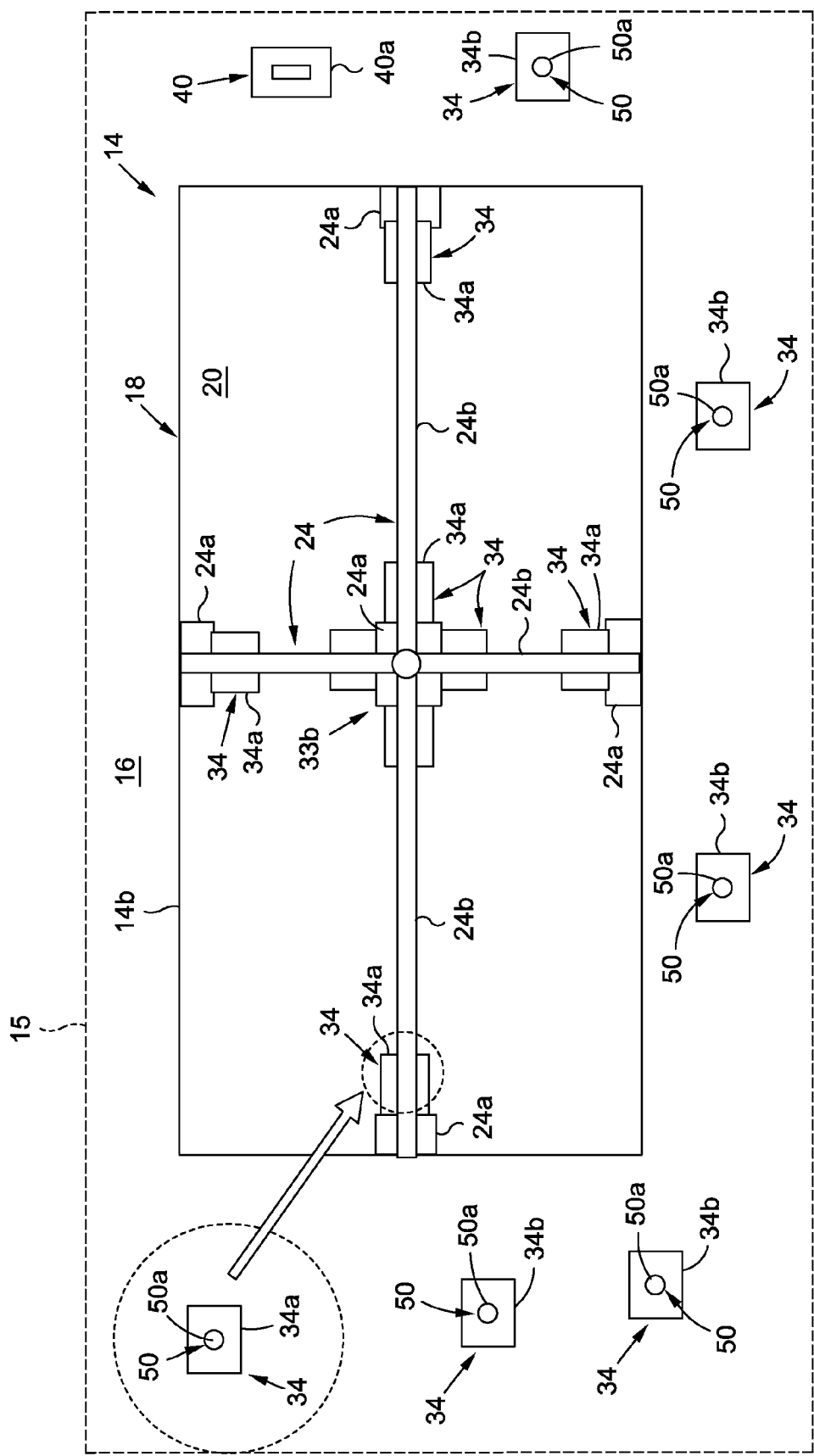
FIG. 1C is an illustration of a top view of the calibration standard assembly of FIG. 1B.
Figure 2A:
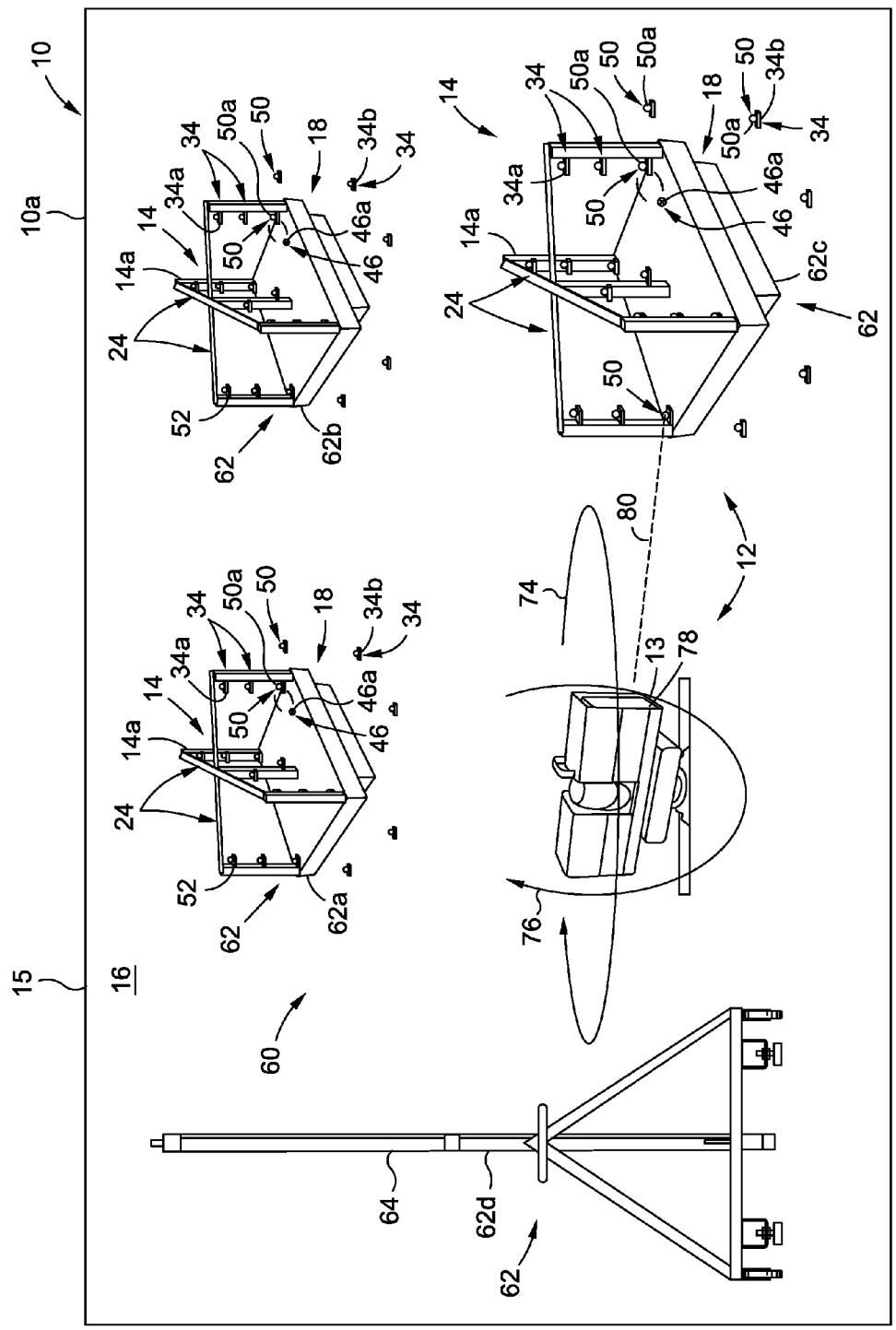
FIG. 2A is an illustration of a perspective view of an embodiment of a calibration system for a three-dimensional measurement system of the disclosure having an embodiment of a three-dimensional calibration standard with the calibration standard assemblies of FIG. 1A and a calibration wall shown in a side view.
Figure 2B:
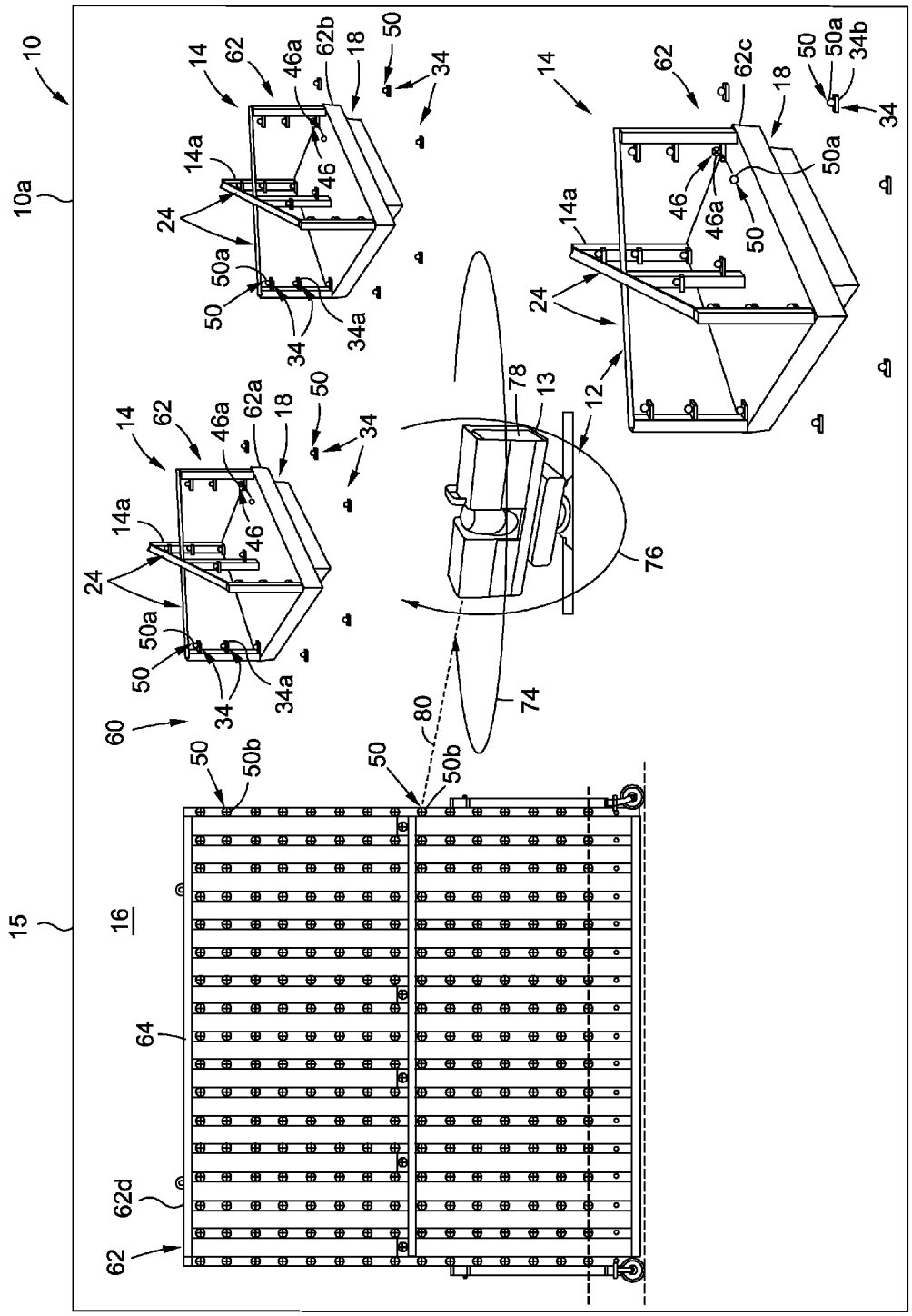
FIG. 2B is an illustration of a perspective view of the embodiment of the calibration system for a three-dimensional measurement system of the disclosure having the embodiment of the three-dimensional calibration standard of FIG. 2A with the calibration standard assemblies of FIG. 1A and a calibration wall shown in a front view.
Figure 2C:
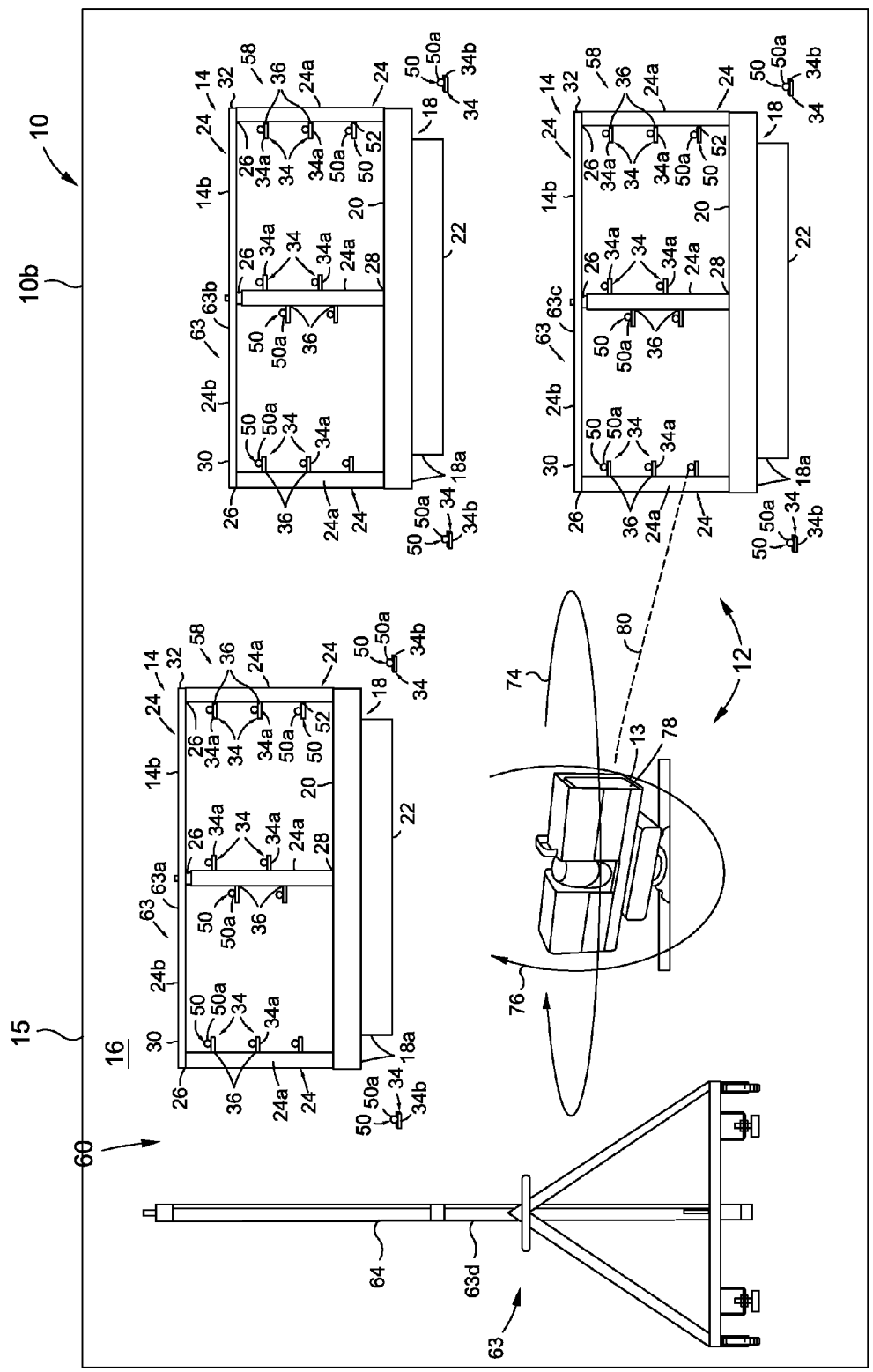
FIG. 2C is an illustration of a perspective view of another embodiment of a calibration system for a three-dimensional measurement system of the disclosure having another embodiment of a three-dimensional calibration standard with the calibration standard assemblies of FIG. 1B and a calibration wall shown in a side view.
Figure 3:
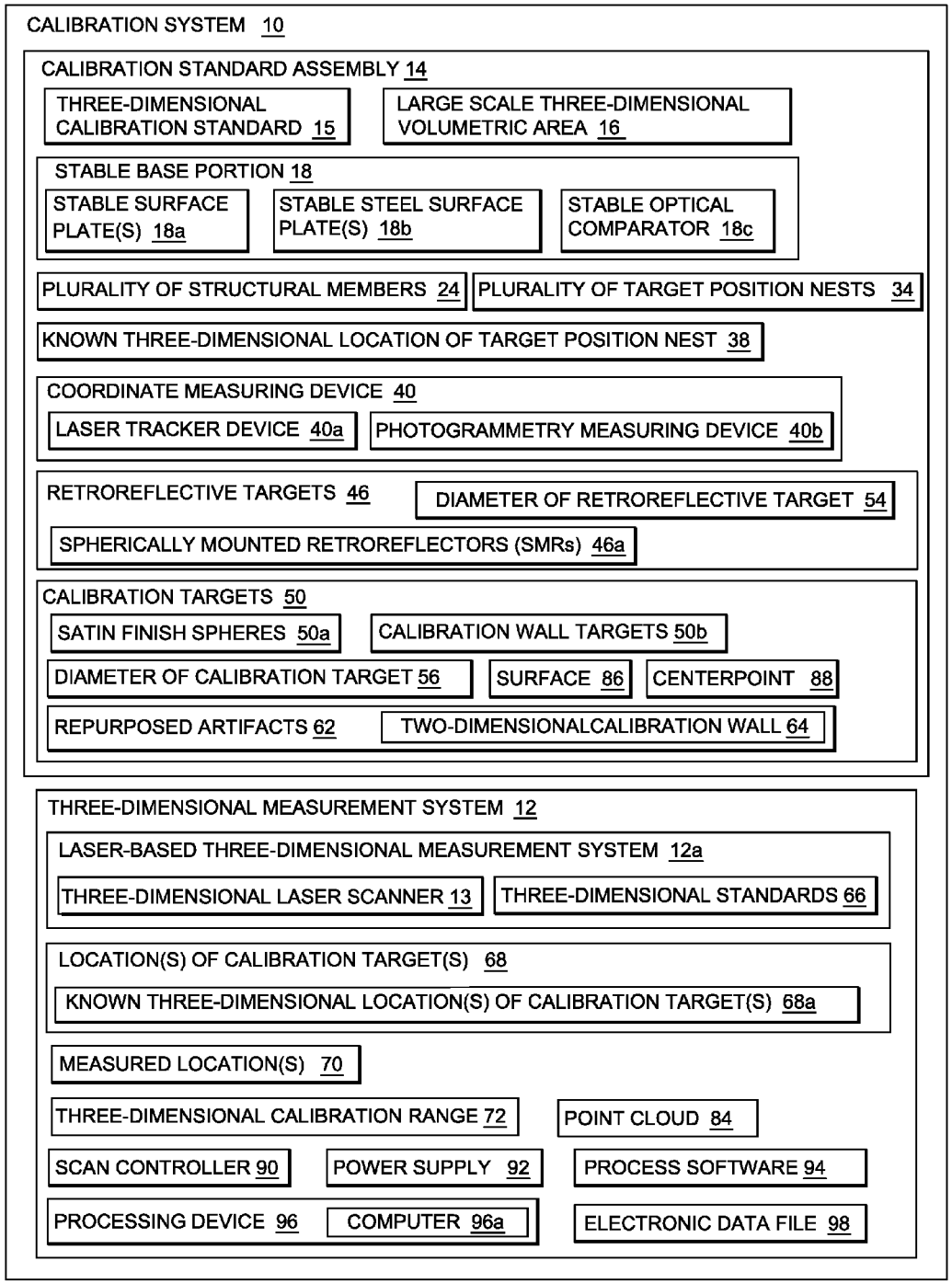
FIG. 3 is an illustration of a functional block diagram showing an embodiment of a calibration system of the disclosure.

In one embodiment of the disclosure there is provided a calibration system 10 (see FIGS. 2A-3) for a three-dimensional measurement system 12 (see FIGS. 2A-3). The calibration system 10 (see FIGS. 2A-3) comprises a calibration standard assembly 14 (see FIGS. 1A-3) positioned in a large scale three-dimensional volumetric area 16 (see FIGS. 1A-3).

Now referring to the Figures, FIG. 1A is an illustration of a perspective view of an embodiment of the calibration standard assembly 14, such as in the form of calibration standard assembly 14a, for use in the calibration system 10 (see FIGS. 2A, 3) for the three-dimensional measurement system 12 (see FIGS. 2A, 3) of the disclosure.

FIG. 1B is an illustration of a side view of another embodiment of the calibration standard assembly 14, such as in the form of calibration standard assembly 14b, for use in the calibration system 10 (see FIGS. 2C, 3) for the three-dimensional measurement system 12 (see FIGS. 2C, 3) of the disclosure. FIG. 1C is an illustration of a top view of the calibration standard assembly 14, such as in the form of calibration standard assembly 14b, of FIG. 1B.

As shown in FIGS. 1A-1C, the calibration standard assembly 14 comprises a stable base portion 18. The stable base portion 18 (see FIGS. 1A-1C) preferably comprises one or more stable surface plates 18a (see FIGS. 1A-1C), one or more stable steel surface plates 18b (see FIG. 3), one or more stable optical comparators 18c (see FIG. 3), or other suitable stable surfaces or artifacts. Preferably, the stable base portion 18 has a large mass and a large size, is stable, and is non-movable or not easily movable. Preferably, the one or more stable surface plates 18a (see FIGS. 1A-1C) that are non-steel are made of granite, concrete or another suitably hard material. The one or more stable surface plates 18a (see FIGS. 1A-1C) are preferably of a suitably large size, for example, 8 feet to 10 feet or more in length, 4 feet to 6 feet or more in width, and 3 feet to 5 feet or more in height. However, other suitably large sizes may also be used.

As further shown in FIGS. 1A-1B, the stable base portion 18 has a top surface 20 and a bottom surface 22. Preferably, the top surface 20 is flat or substantially flat.

As further shown in FIGS. 1A-1B, the calibration standard assembly 14 further comprises a plurality of structural members 24 disposed on the stable base portion 18. The plurality of structural members 24 (see FIGS. 1A-1B) preferably comprise vertical beam members 24a (see FIGS. 1A-1B) extending upwardly from the stable base portion 18. Each vertical beam member 24a (see FIGS. 1A-1B) has a top portion 26 (see FIGS. 1A-1B) and a bottom portion 28 (see FIGS. 1A-1B). The bottom portions 28 (see FIGS. 1A-1B) of the vertical beam members 24a (see FIGS. 1A-1B) are preferably coupled to or connected to the top surface 20 (see FIGS. 1A-1B) of the stable base portion 18 (see FIGS. 1A-1B). The vertical beam members 24a (see FIGS. 1A-1B) are preferably securely attached and firmly mounted to desired locations on the stable base portion 18 (see FIGS. 1A-1B) with one or more suitably secure attachment or mounting elements, such as for example, clamps, bolts, screws, or another suitably secure attachment or mounting element. The desired height and width of the vertical beam members 24a (see FIGS. 1A-1B) depends on the size of the stable base portion 18 (see FIGS. 1A-1C) used, the ceiling height of the large scale three-dimensional volumetric area 16 (see FIGS. 1A-3) in which the calibration standard assembly 14 is positioned, and the ability to maintain the stability of the calibration standard assembly 14 during measurement and calibration.

As shown in FIGS. 1A-1B, the plurality of structural members 24 preferably further comprise horizontal beam members 24b positioned across top portions 26 of the vertical beam members 24a. Each horizontal beam member 24b (see FIGS. 1A-1B) has a first end 30 (see FIGS. 1A-1B) and a second end 32 (see FIGS. 1A-1B). The desired length and width of the horizontal beam members 24b (see FIGS. 1A-1B) depends on the size of the stable base portion 18 (see FIGS. 1A-1C) used, the width or depth of the large scale three-dimensional volumetric area 16 (see FIGS. 1A-3) in which the calibration standard assembly 14 is positioned, and the ability to maintain the stability of the calibration standard assembly 14 during measurement and calibration.

Preferably, the plurality of structural members 24 (see FIGS. 1A-1B) have a modular structure that allows for easy assembly and disassembly on the stable base portion 18 (see FIGS. 1A-1C). The plurality of structural members 24 (see FIGS. 1A-1B) may be coupled or attached to the stable base portion 18 (see FIGS. 1A-1C) in any number of structural configurations. For example, in one embodiment, as shown in FIG. 1A, the plurality of structural members 24 (see FIGS. 1A-1B) form an X-shaped configuration across the stable base portion 18 (see FIG. 1A), where the horizontal beam members 24b (see FIG. 1A) are in a diagonal position 33a (see FIG. 1A) with respect to each other and in relation to the sides of the stable base portion 18 (see FIG. 1A). For example, in another embodiment, as shown in FIGS. 1B-1C, the plurality of structural members 24 (see FIGS. 1B-1C) form a cross-shaped configuration across the stable base portion 18 (see FIG. 1C), where the horizontal beam members 24b (see FIG. 1C) are in a perpendicular position 33b (see FIG. 1C) with respect to each other and in relation to the sides of the stable base portion 18 (see FIG. 1C)

The calibration standard assembly 14 (see FIGS. 1A-3) further comprises a plurality of target position nests 34 (see FIGS. 1A-3) coupled to the plurality of structural members 24. The plurality of target position nests 34 (see FIGS. 1A-3) may comprise elevated target position nests 34a (see FIGS. 1A-1C), and optionally, may comprise floor mounted target position nests 34b (see FIGS. 1A-1C). The elevated target position nests 34a (see FIGS. 1A-1C) are preferably securely attached and firmly mounted to side portions 36 (see FIGS. 1A-1B) of the vertical beam members 24a (see FIGS. 1A-1B) of the plurality of structural members 24 (see FIGS. 1A-1B) with one or more suitably secure attachment or mounting elements, such as for example, clamps, bolts, screws, or another suitably secure attachment or mounting element.

The floor mounted target position nests 34b (see FIGS. 1A-1C) may preferably be securely attached and firmly mounted to desired locations on the floor of the large scale three-dimensional volumetric area 16 (see FIGS. 1A-1C) around the stable base portion 18 (see FIGS. 1A-1C) with one or more suitably secure attachment or mounting elements, such as for example, clamps, bolts, screws, or another suitably secure attachment or mounting element. The floor mounted target position nests 34b (see FIGS. 1A-1C) may increase a three-dimensional calibration range 72 (see FIG. 3) along a vertical axis. The floor mounted target position nests 34b (see FIGS. 1A-1C) may also provide a bridge or link between multiple calibration standard assemblies 14 (see FIGS. 2A-2C) that may be used in the calibration system 10 (see FIGS. 2A-2C) when measurement with a coordinate measuring device 40 (see FIGS. 1A-1C, 3) is conducted, and in particular, when a photogrammetry measuring device 40b (see FIG. 3) is used as the coordinate measuring device 40 (see FIG. 3).

Each target position nest 34 (see FIGS. 1A-3) has a known three-dimensional location 38 (see FIG. 3) that is measured and dimensioned with the coordinate measuring device 40 (see FIGS. 1A-1C, 3) and a plurality of retroreflective targets 46 (see FIGS. 1A-3). The coordinate measuring device 40 (see FIGS. 1A-1C, 3) may comprise a laser tracker device 40a (see FIGS. 1A-1C, 3), a photogrammetry measuring device 40b (see FIG. 3), or another suitable coordinate measuring device.

As used herein, "photogrammetry" means taking multiple photographs of points of interest on an object and based on measurements of the same points of interest from multiple different angles, three-dimensional locations or coordinates of the points of interest are produced from the photographs. An exemplary photogrammetry measuring device 40b (see FIG. 3) that may be used is a V-STARS camera system obtained from Geodetic Systems, Inc. of Melbourne, Fla.

The coordinate measuring device 40 (see FIGS. 1A-1C, 3), such as in the form of the laser tracker device 40a (see FIGS. 1A-1C, 3), comprises a laser 42 (see FIGS. 1A-1B) that emits a laser beam 44 (see FIGS. 1A-1B) to illuminate a retroreflective target 46 (see FIGS. 1A-1B), such as in the form of a spherically mounted retroreflector (SMR) 46a (see FIGS. 1A-1B). The laser tracker device 40a (see FIGS. 1A-1C, 3) is preferably used to determines three-dimensional coordinates (x, y and z coordinates) or locations of a point, such as a center point, by measuring two orthogonal angles, e.g., horizontal and vertical, and a distance to the retroreflective target 46 (see FIGS. 1A-1B), such as in the form of the spherically mounted retroreflector (SMR) 46a (see FIGS. 1A-1B).

Each retroreflective target 46 (see FIGS. 1A-1B) may preferably have a highly reflective point centered at a precise distance from the bottom interface surface of the retroreflective target 46. As used herein, the term "retroreflective" means reflecting a laser beam back in the same direction it came from, which for purposes of this disclosure means back to the coordinate measuring device 40 (see FIGS. 1A-1C), such as in the form of the laser tracker device 40a (see FIG.

A coordinate measurement phase 58 is shown in FIGS. 1A-1B. In the coordinate measurement phase 58, the coordinate measuring device 40 (see FIGS. 1A-1C, 3), such as in the form of the laser tracker device 40a (see FIGS. 1A-1C, 3), used with the retroreflective targets 46 (see FIGS. 1A-1B), such as in the form of the spherically mounted retroreflectors (SMR) 46a (see FIGS. 1A-1B), measures each of the plurality of target position nests 34 (see FIGS. 1A-3) to obtain the known three-dimensional location 38 (see FIG. 3) of each of the plurality of target position nests 34 (see FIGS. 1A-3). Preferably, the laser tracker device 40a (see FIGS. 1A-1C, 3) uses the spherically mounted retroreflector (SMR) 46a (see FIGS. 1A-1B) that it is calibrated with. Measurements taken or obtained with the coordinate measuring device 40 (see FIGS. 1A-1C, 3) may be imported into or used with various known software programs or processes for calculations and/or analysis.

The plurality of target position nests 34 (see FIGS. 1A-3) are preferably configured to seat the plurality of retroreflective targets 46 (see FIGS. 1A-1B), such as in the form of the spherically mounted retroreflectors (SMR) 46a (see FIGS.

1A-1B), during measurement with the coordinate measuring device 40 (see FIGS. 1A-1C, 3). Each target position nest 34 (see FIGS. 1A-3) may be in the form of a flat or substantially flat shelf or mount element that is configured to seat or hold preferably a single retroreflective target 46 (see FIGS. 1A-1B) during measurement with the coordinate measuring device 40 (see FIGS. 1A-1C, 3). As shown in FIGS. 1A-1B, the retroreflective targets 46, such as in the form of the spherically mounted retroreflectors (SMR) 46a, are shown in a seated position 48 on the target position nests 34.

As shown in FIGS. 1A-3, the calibration standard assembly 14 further comprises a plurality of calibration targets 50. The plurality of calibration targets 50 (see FIGS. 1A-3) preferably comprise satin finish spheres 50a (see FIGS. 1A-3). The plurality of target position nests 34 (see FIGS. 1A-3) are configured to seat the plurality of calibration targets 50 (see FIGS. 1A-3), such as in the form of satin finish spheres 50a (see FIGS. 1A-3), during calibration. As shown in FIG. 2A, the calibration targets 50, such as in the form of satin finish spheres 50a, are shown in a seated position 52 on the target position nests 34.

Each of the calibration targets 50 (see FIGS. 1A-3) preferably has a diameter 56 (see FIG. 3) that is the same as a diameter 54 (see FIG. 3) of each of the retroreflective targets 46 (see FIGS. 1A-1B). The size of the retroreflective targets 46 and the size of the calibration targets 50 are preferably the same or substantially the same. An exemplary length of the diameter 56 (see FIG. 3) of the calibration target 50 (see FIGS. 1A-3) and of the diameter 54 of the retroreflective target 46 (see FIGS. 1A-1B) may be 2⅜ inch length diameter. However, any length diameter and size of the retroreflective targets 46 and of the calibration targets 50 may be used that provide a sufficient point cloud 84 (see FIG. 3) to measure a three-dimensional calibration standard 15 (see FIGS. 1A-2C).

As shown in FIGS. 2A-3, the calibration system 10 further comprises a three-dimensional measurement system 12, such as in the form of a laser-based three-dimensional measurement system 12a (see FIG. 3), for measuring locations of the calibration targets 50. The three-dimensional measurement system 12 (see FIGS. 2A-2B) preferably comprises a three-dimensional laser scanner 13 (see FIGS. 2A-3).

FIG. 2A is an illustration of a perspective view of an embodiment of a calibration system 10, such as in the form of calibration system 10a, for a three-dimensional measurement system 12 of the disclosure, and positioned in a large scale three-dimensional volumetric area 16. The calibration system 10 shown in FIG. 2A comprises a three-dimensional calibration standard 15 with three (3) calibration standard assemblies 14, such as in the form of the calibration standard assembly 14a of FIG. 1A shown in a perspective view, and with a two-dimensional calibration wall 64 shown in a side view. The two-dimensional calibration wall 64 may comprise a known two-dimensional calibration wall such as used to calibrate laser projection systems. FIG. 2A further shows an embodiment of multiple repurposed artifacts 62, such as in the form of repurposed stable base portions 62a, 62b, 62c and a repurposed calibration wall 62d. FIG. 2A further shows the three-dimensional laser scanner 13 having a laser 78 that emits a laser beam 80 to illuminate the calibration targets 50 of the calibration standard assemblies 14.

FIG. 2B is an illustration of a perspective view of the embodiment of the calibration system 10, such as in the form of calibration system 10a, for a three-dimensional measurement system 12 of the disclosure, and having the embodiment of the three-dimensional calibration standard 15 of FIG. 2A with the calibration standard assemblies 14 of FIG. 1A, and the two-dimensional calibration wall 64 of FIG. 2A shown in a front view. FIG. 2B further shows an embodiment of multiple repurposed artifacts 63, such as in the form of repurposed stable base portions 63a, 63b, 63c and a repurposed calibration wall 63d. FIG. 2A further shows the three-dimensional laser scanner 13 having a laser 78 that emits a laser beam 80 to illuminate calibration targets 50, such as in the form of calibration wall targets 50b, mounted at multiple points on the two-dimensional calibration wall 64.

FIG. 2C is an illustration of a perspective view of another embodiment of a calibration system 10, such as in the form of calibration system 10b, for a three-dimensional measurement system 12 of the disclosure, and having a three-dimensional calibration standard 15 with the calibration standard assemblies 14, such as in the form of calibration standard assembly 14b of FIG. 1B, and the two-dimensional calibration wall 64 of FIG. 2A shown in a side view. FIG. 2C further shows the three-dimensional laser scanner 13 having a laser 78 that emits a laser beam 80 to illuminate the calibration targets 50 of the calibration standard assemblies 14.

As shown in FIGS. 2A-2C, the three-dimensional laser scanner 13 (see FIGS. 2A-3) preferably has a horizontal rotation 74 (see FIGS. 2A-2C), such as for example, of 360 degrees or another suitable horizontal rotation, and preferably has a vertical rotation 76 (see FIGS. 2A-2C), such as for example, of 270 degrees or another suitable vertical rotation. The three-dimensional laser scanner 13 (see FIGS. 2A-3) that is used preferably has the ability to continuously rotate and measure everything or substantially everything in its path, for example, 360 degrees in the horizontal plane and 270 degrees in the vertical plane, so that it creates almost an entire sphere completely around itself. The three-dimensional calibration standard 15 (see FIGS. 2A-2C) or three-dimensional artifacts are preferably positioned at various different locations throughout or around the three-dimensional laser scanner 13 (see FIGS. 2A-3), so that a true spherical coordinate system is represented rather than a planar segment of an area. Whenever the laser of the three-dimensional laser scanner 13 (see FIGS. 2A-3) hits any object in the large scale three-dimensional volumetric area 16 or room, there is a return light level and it rotates around and creates an image of what is in the large scale three-dimensional volumetric area 16 or room based on the return light levels.

The three-dimensional laser scanner 13 (see FIGS. 2A-2C) preferably has a ranging device with ranging capability and preferably has a measuring range radius of from about 6 feet to about 25 feet. However, other suitable measuring range radii may be used. An exemplary three-dimensional laser scanner 13 (see FIGS. 2A-3) that may be used with the calibration system 10 (see FIGS. 2A-3) disclosed herein is the SURPHASER three-dimensional terrestrial laser scanner from Basis Software, Inc. of Redmond, Wash. (SURPHASER is a registered trademark of Basis Software, Inc. of Redmond, Wash.)

The plurality of calibration targets 50 (see FIGS. 2A-2C) function as three-dimensional standards 66 (see FIG. 3) having locations 68 (see FIG. 3), such as known three-dimensional locations 68a (see FIG. 3), that are used in calibration of the three-dimensional measurement system 12 (see FIGS. 2A-3) based on measurements of the known three-dimensional locations 68a (see FIG. 3) of the plurality of calibration targets 50 (see FIGS. 2A-3) by the three-dimensional measurement system 12 (see FIGS. 2A-3).

A calibration phase 60 is shown in FIGS. 2A-2C. In the calibration phase 60 (see FIGS. 2A-2C), the plurality of retroreflective targets 46 (see FIGS. 2A-2B) positioned on the plurality of target position nests 34 (see FIGS. 2A-2B) are replaced with a plurality of calibration targets 50 (see FIG. 2A-2B), such as in the form of a plurality of satin finish spheres 50*a* (see FIGS. 2A-2B). The three-dimensional measurement system 12 (see FIGS. 2A-2B) measures locations of the calibration targets 50 (see FIGS. 2A-2B) to generate a point cloud 84 (see FIG. 3) of measured locations 70 (see FIG. 3) on a surface 86 (see FIG. 2A) of each calibration target 50 (see FIG. 2A) and to construct a center point 88 (see FIG. 2A) of each calibration target 50 (see FIG. 2A), thus calibrating the three-dimensional measurement system 12 (see FIGS. 2A-2B). As used herein, "point cloud" means a set of data points in a three-dimensional coordinate system, where the data points are defined as x, y and z coordinates and represent the set of points that the three-dimensional measurement system 12 has measured on the surface of the calibration targets 50 (see FIGS. 2A-3). The point clouds 84 (see FIG. 3) may be created by the three-dimensional measurement system 12, such as in the form of the three-dimensional laser scanner 13 (see FIG. 3). The point clouds 84 (see FIG. 3) may be stored in an electronic data file 98 (see FIG. 3), and may be used to create three-dimensional CAD models or other suitable applications.

The calibration is performed using a three-dimensional calibration range 72 (see FIG. 3) and a three-dimensional measurement system 12 (see FIGS. 2A-3) and positioned in a large scale three-dimensional volumetric area 16 (see FIGS. 2A-3) and in a controlled environment, such as a metrology lab or other suitable controlled environment.

Preferably, the plurality of calibration targets 50 (see FIG. 2A-2B), such as in the form of a plurality of satin finish spheres 50*a* (see FIGS. 2A-2B), has a high threshold of points per sphere, such as for example 200 points per sphere. However, as long as the point cloud 84 (see FIG. 3) is covered and a line of sight is present in each of the points, there is no minimum requirement as to how many points are needed. It is desirable to measure the points over a broad area so that the calibration system 10 (see FIG. 3) may map a large scale three-dimensional volumetric area 16 (see FIG. 3).

The three-dimensional measurement system 12 (see FIG. 3) may further comprise a scan controller 90, a power supply 92, a process software 94, a processing device 96 such as in the form of a computer 96*a*, or other suitable devices or components. The process software 94 of the three-dimensional measurement system 12, such as in the form of the three-dimensional laser scanner 13, may comprise a point cloud capture software or another suitable process software. The process software 94 may be imported into or used with various known additional software programs or processes for further calculations and/or analysis.

As shown in FIGS. 2A-2C, the calibration system 10 (see FIGS. 2A-2C) may optionally further comprise a plurality of floor mounted target position nests 34*b* positioned around the stable base portion 18 of the calibration standard assembly 14. The plurality of floor mounted target position nests 34*b* (see FIG. 2A-2C) are preferably configured to seat the plurality of retroreflective targets 46 (see FIGS. 1A-1C) during measurement with the coordinate measuring device 40 (see FIGS. 1A-1C) and configured to seat the plurality of calibration targets 50 (see FIGS. 2A-2C) during calibration.

The calibration standard assembly 14 (see FIGS. 1A-1C) and the three-dimensional measurement system 12*a*, such as in the form of the laser-based three-dimensional measurement system 12*a*, are preferably calibrated to measure aircraft 120 (see FIG. 5) and aircraft components or other large scale three-dimensional structures.

FIG. 3 is an illustration of a functional block diagram showing an embodiment of a calibration system 10 of the disclosure. In the embodiment, as shown in FIG. 3, there is provided a calibration system 10 for a laser-based three-dimensional measurement system 12*a* in a large scale three-dimensional volumetric area 16. As shown in FIG. 3, the calibration system 10 comprises a calibration standard assembly 14 positioned in the large scale three-dimensional volumetric area 16. The calibration standard assembly 14 (see FIG. 3) comprises a stable base portion 18 (see FIG. 3), discussed in detail above, such as one or more stable surface plates 18*a*, one or more stable steel surface plates 18*b*, one or more stable optical comparator 18*c*, or another suitable stable base portion. As further shown in FIG. 3, the calibration standard assembly 14 further comprises a plurality of structural members 24 disposed on the one or more stable surface plates 18*a*.

As shown in FIG. 3, the calibration standard assembly 14 further comprises a plurality of target position nests 34 coupled to the plurality of structural members 24. Each target position nest 34 has a known three-dimensional location 38 measured with a coordinate measuring device 40, such as in the form of a laser tracker device 40*a*, and a plurality of retroreflective targets 46, such as in the form of spherically mounted retroreflectors (SMRs) 46*a*. The plurality of target position nests 34 (see FIG. 3) is preferably configured to seat the plurality of spherically mounted retroreflectors (SMRs) 46*a* during measurement with the laser tracker device 40*a* (see FIGS. 1A-1C, 3).

As shown in FIG. 3, the calibration standard assembly 14 further comprises a plurality of calibration targets 50, such as in the form of satin finish spheres 50*a*, each calibration target 50 having a diameter 56 that is the same length as a diameter 54 of each of the spherically mounted retroreflectors (SMRs) 46*a*. The plurality of target position nests 34 (see FIG. 3) is preferably configured to seat the plurality of satin finish spheres 50*a* during calibration.

As further shown in FIGS. 2A and 3, the three-dimensional calibration standard 15 may comprise repurposed artifacts 62, such as repurposed stable base portions 62*a*, 62*b*, 62*c* of the calibration standard assembly 14, and repurposed calibration wall 62*d* of the two-dimensional calibration wall 64.

The calibration standard assembly 14 (see FIG. 3) may further optionally comprise a plurality of floor mounted target position nests 34*b* (see FIG. 1A-2C) positioned around the one or more stable surface plates 18*a* of the calibration standard assembly 14. The plurality of floor mounted target position nests 34*b* are configured to seat the plurality of spherically mounted retroreflectors (SMRs) 46*a* during measurement with the laser tracker device 40*a* and configured to seat the plurality of satin finish spheres 50*a* during calibration.

As further shown in FIG. 3, the calibration system 10 further comprises a three-dimensional measurement system 12, such as in the form of laser-based three-dimensional measurement system 12*a*, for measuring locations 68 of calibration targets 50, such as in the form of satin finish spheres 50*a*. The laser-based three-dimensional measurement system 12*a* (see FIG. 3) comprises a three-dimensional laser scanner 13 (see FIG. 3), wherein the plurality of calibration targets 50, such as in the form of satin finish spheres 50*a*, are three-dimensional standards 66 (see FIG. 3) having known three-dimensional locations 68*a* (see FIG. 3) that are used in calibration of the laser-based three-dimensional measurement system 12*a* (see FIG. 3) based on measurements of the known three-dimensional locations 68*a* (see FIG. 3) of the plurality of satin finish spheres 50*a* by the three-dimensional laser scanner 13. As shown in FIG. 3, the three-dimensional laser scanner 13 creates a point cloud 84 on the surface 86 of each satin finish sphere 50a to construct a center point 88 of the satin finish sphere 50a.

As further shown in FIG. 3, the laser-based three-dimensional measurement system 12a may further comprise a scan controller 90, a power supply 92, a process software 94, a processing device 96, such as a computer 96a, for processing the process software, 94 and other suitable components. The calibration standard assembly 14 (see FIG. 3) and the laser-based three-dimensional measurement system 12a (see FIG. 3) are preferably calibrated to measure aircraft 120 (see FIG. 5) and aircraft components.

Figure 4:
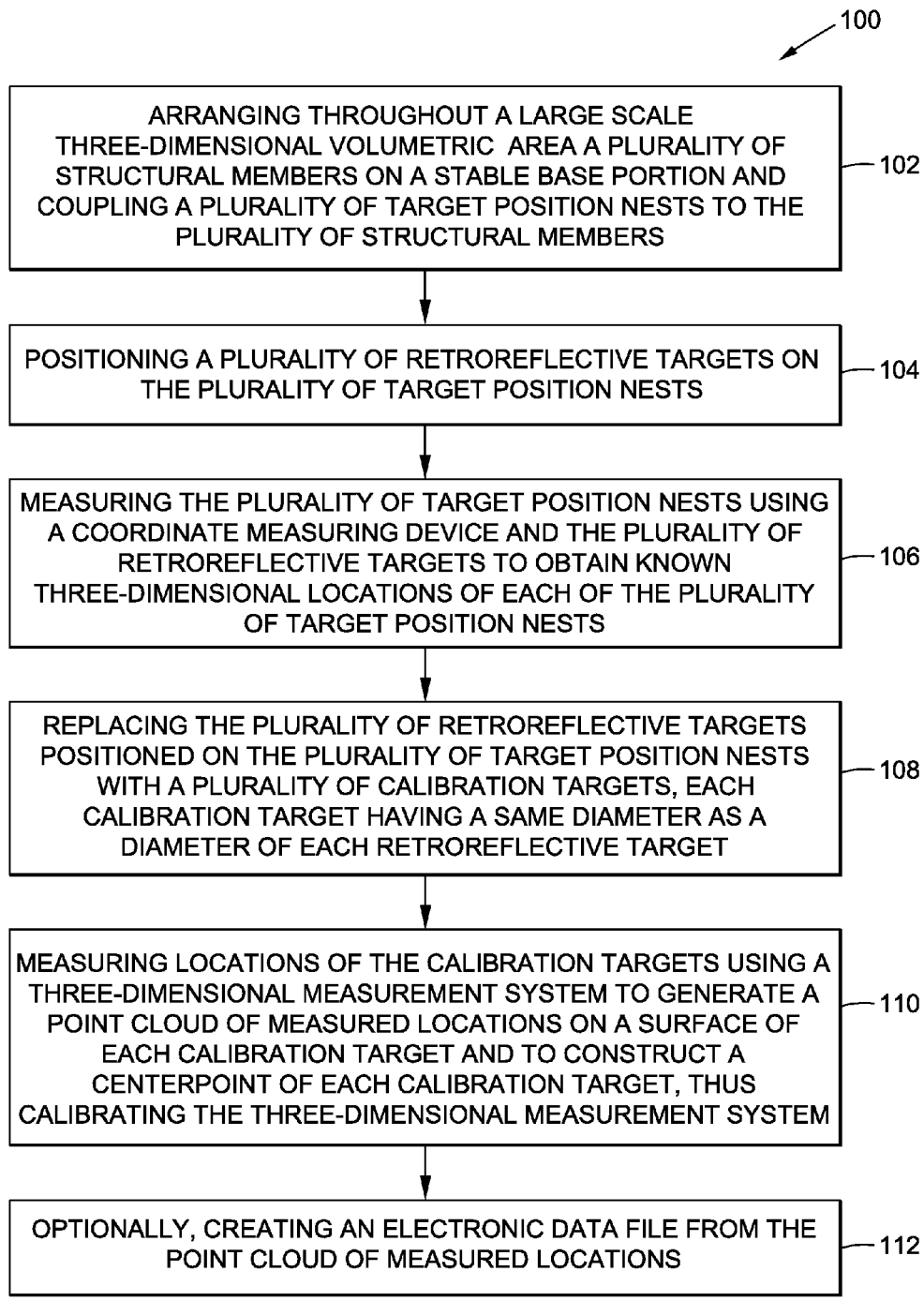
FIG. 4 is an illustration of a flow diagram showing an embodiment of a method of the disclosure.

In another embodiment there is provided a method 100 (see FIG. 4) for calibration of a three-dimensional measurement system 12 (see FIG. 2A). FIG. 4 is an illustration of a flow diagram showing an embodiment of the method 100 of the disclosure.

As shown in FIG. 4, the method 100 comprises step 102 of arranging throughout a large scale three-dimensional volumetric area 16 (see FIG. 1A) a plurality of structural members 24 (see FIG. 1A) on a stable base portion 18 (see FIG. 1A) and coupling a plurality of target position nests 34 (see FIG. 1A) to the plurality of structural members 24 (see FIG. 1A). The step 102 of arranging the plurality of structural members 24 (see FIG. 1A) on the stable base portion 18 (see FIG. 1A) comprises repurposing one or more existing stable surface plates 18a (see FIG. 3) that comprise the stable base portion 18 (see FIG. 1A) for use as three-dimensional standards 66 (see FIG. 3)

As shown in FIG. 4, the method 100 further comprises step 104 of positioning a plurality of retroreflective targets 46 (see FIG. 1A) on the plurality of target position nests 34 (see FIG. 1A). The step 104 of positioning the plurality of retroreflective targets 46 (see FIG. 1A) on the plurality of target position nests 34 (see FIG. 1A) comprises positioning a plurality of spherically mounted retroreflectors (SMRs) 46a (see FIG. 1A) on the plurality of target position nests 34 (see FIG. 1A).

As shown in FIG. 4, the method 100 further comprises step 106 of measuring the plurality of target position nests 34 (see FIG. 1A) using a coordinate measuring device 40 (see FIG. 1A) and the plurality of retroreflective targets 46 (see FIG. 1A) to obtain known three-dimensional locations 38 (see FIG. 3) of each of the plurality of target position nests 34 (see FIG. 1A).

As shown in FIG. 4, the method 100 further comprises step 108 of replacing the plurality of retroreflective targets 46 (see FIG. 2A) positioned on the plurality of target position nests 34 (see FIG. 2A) with a plurality of calibration targets 50 (see FIG. 2A). Each calibration target 50 (see FIG. 2A) preferably has a same diameter 56 (see FIG. 3) as a diameter 54 (see FIG. 3) of each retroreflective target 46 (see FIG. 2A). The step 108 of replacing the plurality of retroreflective targets 46 (see FIG. 2A) positioned on the plurality of target position nests 34 (see FIG. 2A) with the plurality of calibration targets 50 (see FIG. 2A) comprises replacing the plurality of retroreflective targets 46 (see FIG. 2A) with a plurality of satin finish spheres 50a (see FIG. 2A).

As shown in FIG. 4, the method 100 further comprises step 110 of measuring locations of the calibration targets 50 (see FIG. 2A) using a three-dimensional measurement system 12 (see FIG. 2A) to generate a point cloud 84 (see FIG. 3) of measured locations 70 (see FIG. 3) on a surface 86 (see FIG. 2A) of each calibration target 50 (see FIG. 2A) and to construct a center point 88 (see FIG. 2A) of each calibration target 50 (see FIG. 2A), thus calibrating the three-dimensional measurement system 12 (see FIG. 2A). The method of claim 16 wherein the step of measuring locations of the calibration targets using a three-dimensional measurement system comprises measuring locations of the calibration targets using a three-dimensional laser scanner.

As shown in FIG. 4, the method 100 may further comprise optional step 110 of creating an electronic data file 98 (see FIG. 3) from the point cloud 94 (see FIG. 3) of measured locations 70 (see FIG. 3). The electronic data file 98 may be imported into a software program or process for further calculations and analysis.

Figure 5:
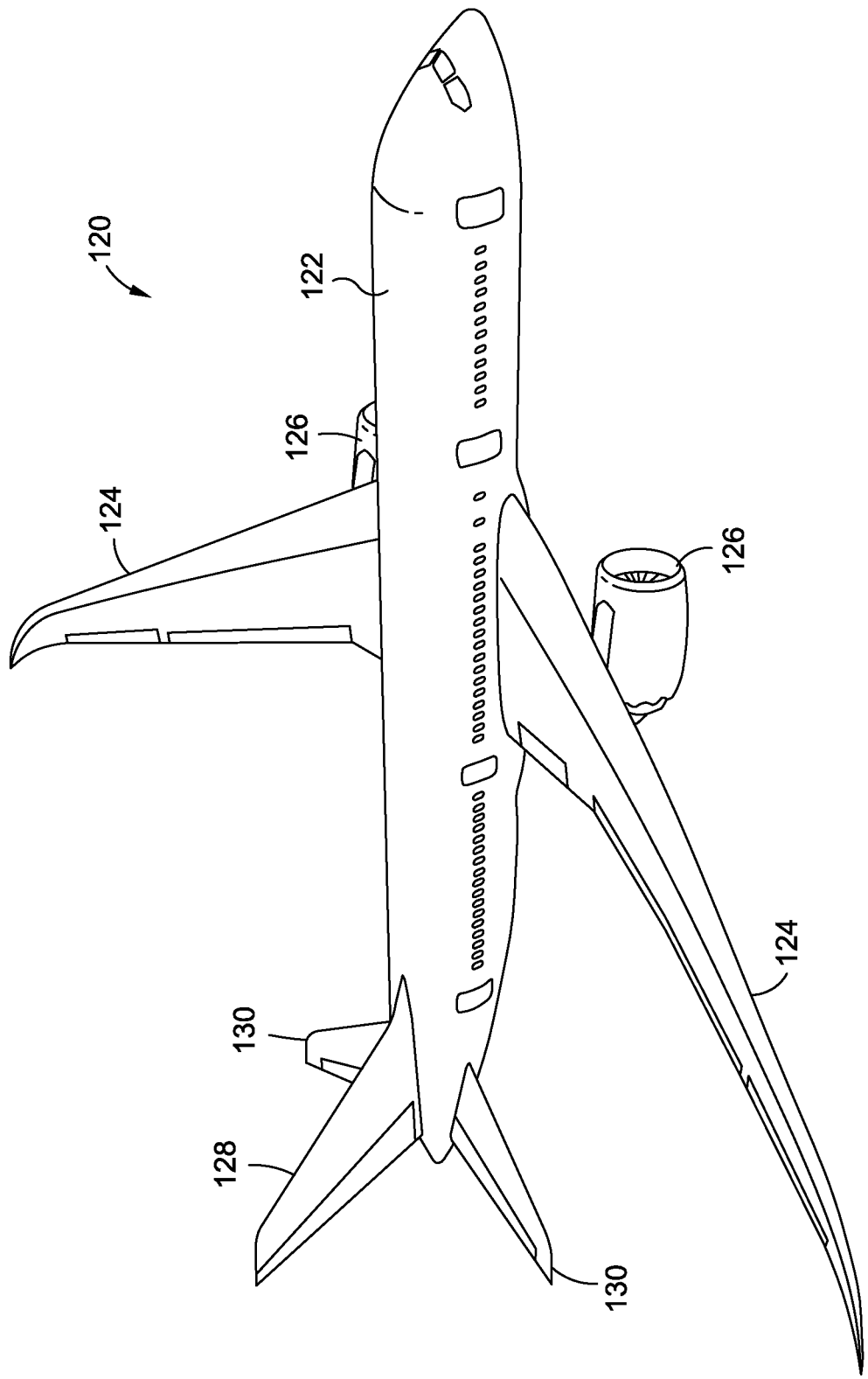
FIG. 5 is an illustration of a perspective view of an aircraft that may be measured using one of the embodiments of the calibration system and method of the disclosure.

FIG. 5 is an illustration of a perspective view of an aircraft 120 that may be measured using one of the embodiments of the calibration system 10 (see FIG. 3) and method 100 of the disclosure. As shown in FIG. 5, the aircraft 120 comprises such components as a fuselage 122, wings 124, engines 126, a vertical stabilizer 128, and horizontal stabilizers 130.

Figure 6:
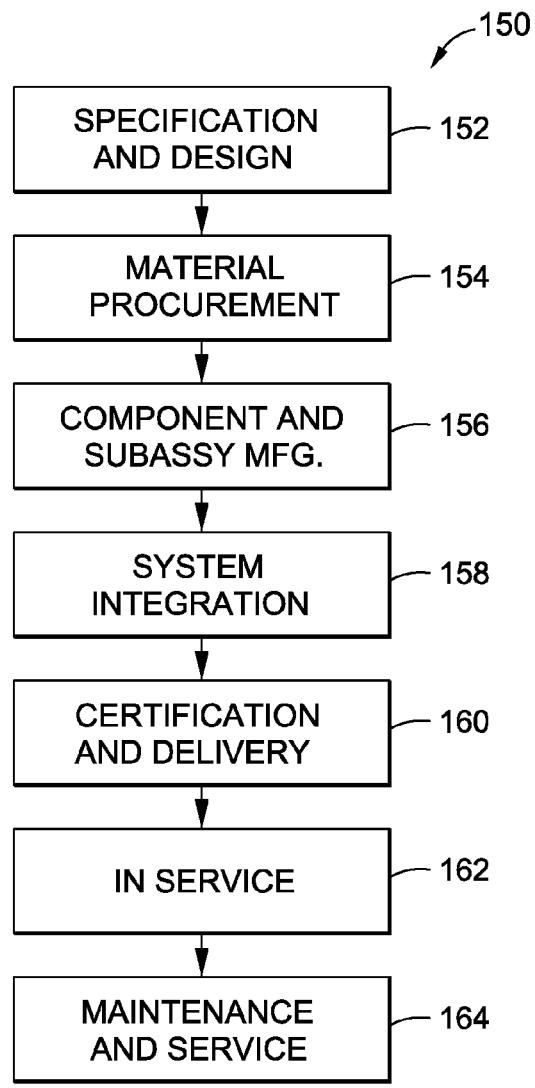
FIG. 6 is an illustration of a flow diagram of an aircraft production and service method; and, FIG. 7 is an illustration of a block diagram of an aircraft.
Figure 7:
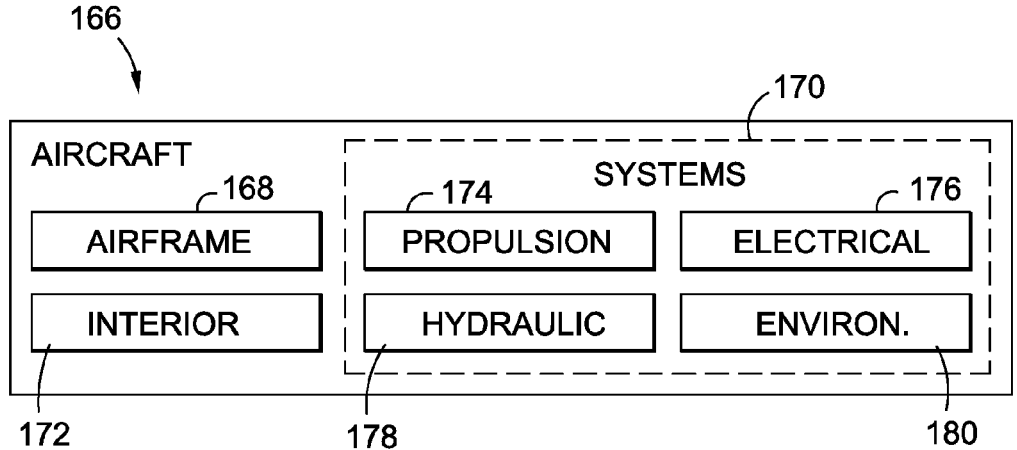

FIG. 6 is an illustration of a flow diagram of an aircraft production and service method 150. FIG. 7 is an illustration of a block diagram of an aircraft 166. Referring to FIGS. 6-7, embodiments of the disclosure may be described in the context of the aircraft production and service method 150, as shown in FIG. 6, and the aircraft 166, as shown in FIG. 7. During pre-production, exemplary aircraft production and service method 150 may include specification and design 152 of the aircraft 166 and material procurement 154. During production, component and subassembly manufacturing 156 and system integration 158 of the aircraft 166 takes place. Thereafter, the aircraft 166 may go through certification and delivery 160 in order to be placed in service 162. While in service 162 by a customer, the aircraft 166 may be scheduled for routine maintenance and service 164 which may also include modification, reconfiguration, refurbishment, and other suitable services.

Each of the processes of the aircraft production and service method 150 may be performed or carried out by a system integrator, a third party and/or an operator (e.g., a customer). For the purposes of this description, a system integrator may include without limitation any number of aircraft manufacturers and major-system subcontractors; a third party may include without limitation any number of vendors, subcontractors and suppliers; and, an operator may be an airline, leasing company, military entity, service organization and other suitable operators.

As shown in FIG. 7, the aircraft 166 produced by exemplary aircraft production and service method 150 may include an airframe 168 with a plurality of high-level systems 170 and an interior 172. Examples of the plurality of high-level systems 170 may include one or more of a propulsion system 174, an electrical system 176, a hydraulic system 178, and an environmental system 180. Any number of other systems may also be included. Although an aerospace example is shown, the principles of the invention may be applied to other industries, such as the automotive industry.

Methods and systems embodied herein may be employed during any one or more of the stages of the aircraft production and service method 150. For example, components or subassemblies corresponding to component and subassembly manufacturing 156 may be fabricated or manufactured in a manner similar to components or subassemblies produced while the aircraft 166 is in service 162. Also, one or more apparatus embodiments, method embodiments, or a combination thereof, may be utilized during component and subassembly manufacturing 156 and system integration 158, for example, by substantially expediting assembly of or reducing the cost of the aircraft 166. Similarly, one or more of apparatus embodiments, method embodiments, or a combination thereof, may be utilized while the aircraft 166 is in service 162, for example and without limitation, to routine maintenance and service 164.

Disclosed embodiments of the calibration system 10 (see FIGS. 2A-3) and method 100 (see FIG. 4) provide three-dimensional calibration standards 15 (see FIGS. 2A-3) at known three-dimensional locations or coordinates 68a (see FIG. 3) for use as three-dimensional standards 66 (see FIG. 3) or calibration references for large scale three-dimensional measurement systems 12, such as a three-dimensional laser scanner 13 (see FIG. 3), having large volumetric and high speed measurement capabilities. Further, disclosed embodiments of the calibration system 10 (see FIGS. 2A-3) and method 100 (see FIG. 4) allow for the repurposing of large stable standards, such as stable surface plates 18a (see FIGS. 1A-1C), for use as large scale three-dimensional volumetric area standards in a stable controlled environment, such as a metrology lab or other suitable stable controlled environment.

In addition, disclosed embodiments of the calibration system 10 (see FIGS. 2A-3) and method 100 (see FIG. 4) significantly improve the capability to calibrate moderate accuracy three-dimensional measurement systems 12, such as three-dimensional laser scanners 13 (see FIG. 3), while eliminating the need to occupy more area to support a low frequency of calibration for the three-dimensional measurement systems 12. The calibration system 10 (see FIG. 3) consists of an existing plurality of target position nests 34 (see FIGS. 1A-3) coupled or attached to a plurality of structural members 24 (see FIGS. 1A-3) to modify stable surface plates 18a (see FIGS. 1A-3), and potentially other large stable fixtures, for use as three-dimensional standards 66 (see FIG. 3), while maintaining their original purpose, such as in the case of stable surface plate 18a (see FIGS. 1A-3) calibration standards. The plurality of target position nests 34 (see FIGS. 1A-3) are then measured for their known three-dimensional locations 38 (see FIG. 3) in three-dimensional space. Then a calibration target 50 (see FIGS. 1A-3), such as in the form of a satin finish sphere 50a (see FIGS. 1A-3), or other artifact with a suitable finish or texture, of the same diameter as the retroreflective target 46, such as in the form of a spherically mounted retroreflector (SMR) 46a (see FIG. 3). The calibration will be performed using a three-dimensional calibration range 72 (see FIG. 3) in an existing controlled environment.

Further, disclosed embodiments of the calibration system 10 (see FIGS. 2A-3) and method 100 (see FIG. 4) provide an accurate measurement for measuring aircraft 120 (see FIG. 5) or aircraft components once the three-dimensional laser scanner 13 (see FIG. 3) is calibrated.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A calibration system for a three-dimensional measurement system, the calibration system comprising:
   a calibration standard assembly positioned in a large scale three-dimensional volumetric area, the calibration standard assembly comprising:
   a stable base portion;
   a plurality of structural members disposed on the stable base portion;
   a plurality of target position nests coupled to the plurality of structural members, each target position nest having a known three-dimensional location measured with a coordinate measuring device and a plurality of retroreflective targets, the plurality of target position nests being configured to seat the plurality of retroreflective targets during measurement with the coordinate measuring device;
   a plurality of calibration targets each having a same diameter as a diameter of each of the retroreflective targets, the plurality of target position nests being configured to seat the plurality of calibration targets during calibration; and,
   a three-dimensional measurement system for measuring locations of the plurality of calibration targets, wherein the plurality of calibration targets are three-dimensional standards having known three-dimensional locations that are used in calibration of the three-dimensional measurement system based on measurements of the known three-dimensional locations of the plurality of calibration targets by the three-dimensional measurement system.

2. The calibration system of claim 1 further comprising a plurality of floor mounted target position nests positioned around the stable base portion of the calibration standard assembly, the plurality of floor mounted target position nests configured to seat the plurality of retroreflective targets during measurement with the coordinate measuring device and configured to seat the plurality of calibration targets during calibration.

3. The calibration system of claim 1 wherein the stable base portion comprises one or more stable surface plates, one or more stable steel surface plates, or one or more stable optical comparators.

4. The calibration system of claim 1 wherein the plurality of structural members comprise vertical beam members extending upwardly from the stable base portion, and horizontal beam members positioned across top portions of the vertical members.

5. The calibration system of claim 1 wherein the coordinate measuring device comprises one of a laser tracker device or a photogrammetry measuring device.

6. The calibration system of claim 1 wherein the plurality of retroreflective targets comprise spherically mounted retroreflectors (SMRs).

7. The calibration system of claim 1 wherein the plurality of calibration targets comprise satin finish spheres.

8. The calibration system of claim 1 wherein the three-dimensional measurement system comprises a three-dimensional laser scanner.

9. The calibration system of claim 8 wherein the three-dimensional laser scanner creates a point cloud of measured locations on a surface of each calibration target to construct a center point of the calibration target.

10. The calibration system of claim 1 wherein the three-dimensional measurement system further comprises a scan controller, a power supply, a process software, and a processing device for processing the process software.

11. The calibration system of claim 1 wherein the calibration standard assembly and the three-dimensional measurement system are calibrated to measure aircraft and aircraft components.

12. A calibration system for a laser-based three-dimensional measurement system in a large scale three-dimensional volumetric area, the calibration system comprising:

a calibration standard assembly positioned in the large scale three-dimensional volumetric area, the calibration standard assembly comprising:
one or more stable surface plates;
a plurality of structural members disposed on the one or more stable surface plates;
a plurality of target position nests coupled to the plurality of structural members, each target position nest having a known three-dimensional location measured with a laser tracker device and a plurality of spherically mounted retroreflectors (SMRs), the plurality of target position nests being configured to seat the plurality of spherically mounted retroreflectors (SMRs) during measurement with the laser tracker device;
a plurality of satin finish spheres each having a same diameter as a diameter of each of the spherically mounted retroreflectors (SMRs), the plurality of target position nests being configured to seat the plurality of satin finish spheres during calibration;
a plurality of floor mounted target position nests positioned around the one or more stable surface plates of the calibration standard assembly, the plurality of floor mounted target position nests configured to seat the plurality of spherically mounted retroreflectors (SMRs) during measurement with the laser tracker device and configured to seat the plurality of satin finish spheres during calibration; and,
a laser-based three-dimensional measurement system for measuring locations of the satin finish spheres, the laser-based three-dimensional measurement system comprising a three-dimensional laser scanner, wherein the plurality of satin finish spheres are three-dimensional standards having known three-dimensional locations that are used in calibration of the laser-based three-dimensional measurement system based on measurements of the known three-dimensional locations of the plurality of satin finish spheres by the three-dimensional laser scanner.

13. The calibration system of claim 12 wherein the three-dimensional laser scanner creates a point cloud on a surface of each satin finish sphere to construct a center point of the satin finish sphere.

14. The calibration system of claim 12 wherein the laser-based three-dimensional measurement system further comprises a scan controller, a power supply, a process software, and a processing device for processing the process software.

15. The calibration system of claim 12 wherein the calibration standard assembly and the laser-based three-dimensional measurement system are calibrated to measure aircraft and aircraft components.

16. A method for calibration of a three-dimensional measurement system, the method comprising the steps of:
arranging throughout a large scale three-dimensional volumetric area a plurality of structural members on a stable base portion and coupling a plurality of target position nests to the plurality of structural members;
positioning a plurality of retroreflective targets on the plurality of target position nests;
measuring the plurality of target position nests using a coordinate measuring device and the plurality of retroreflective targets to obtain known three-dimensional locations of each of the plurality of target position nests;
replacing the plurality of retroreflective targets positioned on the plurality of target position nests with a plurality of calibration targets, each calibration target having a same diameter as a diameter of each retroreflective target; and,
measuring locations of the calibration targets using a three-dimensional measurement system to generate a point cloud of measured locations on a surface of each calibration target and to construct a center point of each calibration target, thus calibrating the three-dimensional measurement system.

17. The method of claim 16 further comprising the step of creating an electronic data file from the point cloud of measured locations.

18. The method of claim 16 wherein the step of arranging the plurality of structural members on the stable base comprises repurposing one or more existing stable surface plates that comprise the stable base portion for use as three-dimensional standards.

19. The method of claim 16 wherein the step of positioning the plurality of retroreflective targets on the plurality of target position nests comprises positioning a plurality of spherically mounted retroreflectors (SMRs) on the plurality of target position nests.

20. The method of claim 16 wherein the step of replacing the plurality of retroreflective targets positioned on the plurality of target position nests with the plurality of calibration targets comprises replacing the plurality of retroreflective targets with a plurality of satin finish spheres.

21. The method of claim 16 wherein the step of measuring locations of the calibration targets using a three-dimensional measurement system comprises measuring locations of the calibration targets using a three-dimensional laser scanner.

* * * * *